US006200645B1

(12) United States Patent
Blum et al.

(10) Patent No.: US 6,200,645 B1
(45) Date of Patent: Mar. 13, 2001

(54) POLYESTER RESIN IMPREGNATING AND COATING SOLUTIONS AND THEIR USE

(75) Inventors: Rainer Blum, Ludwigshafen; Klaus-Wilhelm Lienert, Hamburg; Manfred Eichhorst, Oststeinbek, all of (DE)

(73) Assignee: Schnectady International Inc., Schnectady, NY (US)

( * ) Notice: Subject to any disclaimer, the term of this patent is extended or adjusted under 35 U.S.C. 154(b) by 0 days.

(21) Appl. No.: 09/367,931

(22) PCT Filed: Feb. 24, 1998

(86) PCT No.: PCT/EP98/01043

§ 371 Date: Oct. 27, 1999

§ 102(e) Date: Oct. 27, 1999

(87) PCT Pub. No.: WO98/38236

PCT Pub. Date: Sep. 3, 1998

(30) Foreign Application Priority Data

Feb. 25, 1997 (DE) ................................. 197 07 478

(51) Int. Cl.$^7$ ................................. B05D 3/02; B05D 3/06
(52) U.S. Cl. .................... 427/487; 427/493; 427/385.5
(58) Field of Search ........................... 427/487, 493, 427/385.5; 528/271

(56) References Cited

U.S. PATENT DOCUMENTS 4,261,872 * 4/1981 Emmons et al. ................ 260/22 CB

FOREIGN PATENT DOCUMENTS

| 257945 | * 7/1988 | (DD) . |
| 1570273 | 2/1970 | (DE) . |
| 1720323 | 6/1971 | (DE) . |
| 3107450 | 10/1982 | (DE) . |
| 3230924 | 2/1984 | (DE) . |
| 196 00 149 | 7/1997 | (DE) . |
| 008828 | 3/1980 | (EP) . |
| 118786 | 9/1984 | (EP) . |
| 260688 | 3/1988 | (EP) . |
| 996745 | 6/1965 | (GB) . |
| 9-188730 | * 7/1997 | (JP) . |
| 97/25362 | 7/1997 | (WO) . |

* cited by examiner

Primary Examiner—Erma Cameron
(74) Attorney, Agent, or Firm—Keil & Weinkauf

(57) ABSTRACT

The polyester resin impregnating and coating solution comprises polyesters having structures of the formula (I)

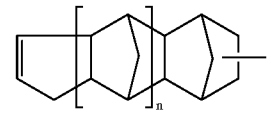

(I)

where n is from 0 to 10
and where the solution is essentially free from monomers containing acrylic, vinylic or allylic unsaturation and where the solvent employed preferably comprises aliphatic saturated $C_{2-6}$ alcohols, $C_{3-6}$ ketones or $C_{3-6}$ carboxylic esters or mixtures thereof, the proportion of the solvent being from 5 to 60% by weight of the overall polyester resin impregnating and coating solution.

14 Claims, No Drawings

POLYESTER RESIN IMPREGNATING AND COATING SOLUTIONS AND THEIR USE

This is the U.S. national stage of international application PCT/EP98/01043 and is filed under 35 U.S.C. 371.

The invention relates to polyester resin impregnating and coating solutions, to their use for coating shaped articles, and to corresponding processes for the coating of shaped articles.

It is necessary to provide the windings and surfaces of electrical components with electrically insulating coatings for electrical insulation and for protection against external influences such as rain, splashes of water, dust, salts, solvents or mechanical influences. These coatings can be produced by impregnation or coating with electrically insulating resins. At the present time, polyester resin compositions are principally employed for these applications.

In this context it is common to employ unsaturated polyesters as impregnating resin in the form of a solution in a copolymerizable monomer, generally styrene. Following the coating of the shaped articles or components with the polyester resin compositions they are cured by copolymerization with the monomers, especially styrene.

DE-A-31 07 450 describes unsaturated polyesters of this kind containing cyclopentadiene oligomers as end groups. They are composed of maleic acid as unsaturated acid component and are employed in the form of solutions in styrene for the production of shaped articles and coatings.

DE-A-32 30 924 describes processes for preparing unsaturated polyester resins based on maleic anhydride as unsaturated acid component, the resulting polyesters being reacted with dicyclopentadiene, and esterification being carried out in the presence of N-hydroxyalkylimides of monounsaturated cycloaliphatic 1,2-dicarboxylic acids. The polyesters are dissolved in styrene.

EP-B-0 118 786 and EP-B-0 260 688 describe processes for preparing molding materials from unsaturated polyester resins, where esters, based on maleic anhydride as a saturated acid and reacted with dicyclopentadiene, are dissolved in styrene and cured in a two-stage curing process using two different free-radical initiators.

DE-A-1 570 273 and DE-A-1 720 323 describe unsaturated polyesters having cyclic imide groups. These polyesters are also employed as a solution in styrene.

In addition, impregnating varnishes are employed. They comprise dissolved resins, which are frequently based on natural oils and resins and which may also be chemically modified and combined with synthetic polymers, such as alkyd-epoxy resins or phenolic resins. For processing they are dissolved in solvents with typical concentrations of about 50%. The solvents employed here are predominantly aromatic hydrocarbons, such as toluene or xylene, alone or in combination with aliphatic or cycloaliphatic hydrocarbons, such as white spirit. In this case, only low concentrations are obtained in these solutions. Moreover, a high level of safety expenditure is necessary because of the solvents used.

When the above-described polyesters are employed as impregnating resins in the form of solutions in copolymerizable monomers, such as acrylates, allyl phthalate, styrene, methylstyrene or methyltoluene or vinyltoluene, or as impregnating varnishes in the form of solutions in aromatics, some of these monomers or aromatics are released in the course of the use of the mixtures for coating. Known applications of impregnating compositions with these substances are accompanied by losses in mass of about 20 to 30%. These considerable amounts must be removed from the workplace, since the monomers or aromatics are in many cases injurious to health and irritant to the skin, and thus constitute a health hazard to those working with these materials. The amounts of monomer or aromatics drawn off by suction are generally disposed of in waste-air incinerators, possibly giving rise to unwanted emissions. Furthermore, the substances lost in this way represent a considerable economic loss. Furthermore, there is a risk that the monomers will not be completely copolymerized in the course of curing. Residual monomers and aromatics remaining in the cured compositions may escape, especially from electrical insulation compositions, which generally become hot during use, and can cause odor pollution or damage to health. The monomers may also undergo after curing in the compositions, as a result of which they may undesirably alter the service properties of the compositions.

It is an object of the present invention to provide polyester resin impregnating and coating solutions (impregnating varnishes) which avoid these disadvantages and which, in particular, have a high solids content and an acceptable solvent.

We have found that this object is achieved in accordance with the invention by a polyester resin impregnating and coating solution comprising polyesters having structures of the formula (I)

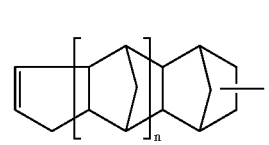

(I)

where n is from 0 to 10 and where the solution is essentially free from monomers containing acrylic, vinylic or allylic unsaturation.

It has been found in accordance with the invention that the abovementioned unsaturated polyesters or polyester resins can be cured even without the use of the monomers containing acrylic, allylic or vinylic unsaturation which have hitherto been regarded as absolutely necessary. The compositions are essentially free from these monomers. The term "essentially" means here that there are no amounts of monomers containing acrylic, allylic or vinylic unsaturation that substantially alter the properties of the polyester resin compositions. The amount of monomers containing acrylic, allylic or vinylic unsaturation is preferably not more than 30, particularly preferably not more than 10 and, in particular, not more than 5% by weight based on the overall weight of the polyester resin compositions. With particular preference the polyester resin compositions are free from monomers containing acrylic, allylic or vinylic unsaturation. It has been found that, by using solvents other than compounds containing acrylic, allylic or vinylic unsaturation, it is possible to obtain highly concentrated polyester resin solutions. The content of solvents is preferably from 5 to 60, particularly preferably from 8 to 20, in particular from 10 to 15% by weight, based on the overall weight of the polyester resin solution. The term "solvent" here means those solvents or diluents which are preferably partially or completely free from aromatics which do not enter into any chemical reactions, especially in the course of curing. These are compounds which during or after curing escape from the polyester resin compositions or remain in them without entering into chemical bonds to the polymer structure. Monomeric or oligomeric compounds carrying functional groups which allow them to be reacted in the course of curing of the polyester resin are not embraced by the term "solvent". As solvents it is preferred to employ aliphatic saturated $C_{2-6}$ alcohols, $C_{3-6}$ ketones or $C_{3-6}$ carboxylic esters or mixtures thereof It is particularly preferred to employ aliphatic saturated $C_{2-4}$ alcohols, such as ethanol n-propanol, isopropanol, n-butanol, isobutanol and tert-butanol. The polyester resins employed in accordance with the invention are highly soluble in these solvents, preferably in concentrations of more than 70% by weight, with particular preference more than 75% by weight, and in particular, more than 80% by weight. The solvents dry well so that the polyester resin compositions, after application, can easily be freed from the solvents. The health hazard due to the preferred solvents is low compared to aromatic solvents. The solutions here are of low viscosity, rendering them suitable as impregnating and coating solutions for the coating of shaped articles.

The shaped articles coated by the novel process are preferably electronic or electrical components or carrier materials for electrical insulators, especially flat electrical insulators. Examples of such shaped articles or components are wires, coils, motor windings, transformer windings and other components. Insulators which can be used include carrier materials for sheet-like insulating materials, such as glass fibers, mica tapes and other absorbent materials, and also combinations thereof, and in this context one option is to terminate curing of these materials at the B-stage in order to obtain curable prepregs. Curing is ended when the prepregs have solidified to an extent where they are not stuck together and can be stacked or wound.

The polyester resin solutions employed in accordance with the invention are impregnating, casting or coating solutions. The process according to the invention for coating shaped articles comprises the generally known processes of dip impregnation, the trickle technique, the dip rolling process, the flooding process and the process of casting for the impregnation of windings. These processes can if desired be assisted by the use of reduced pressure and/or superatmospheric pressure. Suitable processes are known to the skilled worker. The invention also provides a process for coating shaped articles by impregnating in, casting with or coating with polyester resin solutions, as defined above, removing the solvent and thermally and/or photochemically curing the polyester resin coating.

The polyester resin solutions employed in accordance with the invention can be heated in the process for coating in order to reduce the viscosity and to facilitate their application. The polyester resin solutions employed in accordance with the invention can be processed on known installations with little or no modification.

The polyester resin compositions employed in accordance with the invention in the polyester resin solutions comprise unsaturated polyesters. These polyester resins can be synthesized by known processes for the preparation of polyesters, generally by polycondensation of polyfunctional hydroxy compounds with polyfunctional acids and/or their anhydrides at relatively high temperatures. It is often advantageous to start from the esters of such substances and to obtain the polyesters by transesterification at relatively high temperatures, since in some cases such transesterifications proceed more readily and more rapidly than direct esterification. In addition, it is also possible to use polyfunctional amines as well, in which case polyesters having amide structures are obtained. The use of monofunctional starting materials is another possibility, for example in order to regulate the molecular weight. All known polyester resins can be employed in accordance with the invention provided they comprise at least partially unsaturated polyesters.

Examples of basic structural units from which the polyesters can be built are:

adipic acid, suberic acid, phthalic acid isomers, tetrahydrophthalic, endomethylenetetrahydrophthalic, hexahydrophthalic, fumaric, maleic, itaconic, citraconic, trimellitic and pyromellitic acid, ethylene glycol, polyethylene glycols, propylene glycol, polypropylene glycols, butanediol isomers, hexanediol, neopentylglycol, trimethylolpropane, glycerol, pentaerythritol, bisphenol A, hydrogenated bisphenol A, OH-polyfunctional polymers, such as hydroxyl-modified polybutadienes or hydroxyl-carrying polyurethane prepolymers and epoxy resins, polyfunctional natural substances or derivatives thereof, such as linseed oil fatty acid, dimeric and polymeric linseed oil fatty acid, castor oil, castor oil fatty acid.

The introduction of amide and imide structures is described, for example, in DE-A-1 570 273 and DE-A-1 720 323. Such polyester amides or polyester imides are employed, for example, if there are particular requirements in respect of thermal stability.

The polyesters employed in accordance with the invention are unsaturated overall. In this case the double bonds are preferably provided by the structures below of the formula (I) and if desired by unsaturated dicarboxylic acids or their anhydrides, such as fumaric, maleic, itaconic or citraconic acid or their anhydrides or mixtures thereof As a result, the unsaturated polyesters are based on the structures of the formula (I) and, if desired, these acids as unsaturated compounds.

The polyester resin compositions employed can additionally comprise saturated polyesters. Saturated polyesters have no C—C double or triple bonds. Aromatic unsaturation and the double bond in the 5-membered ring of the structures of the formulae (I) and (II) are not regarded as double bond in this case since they do not participate in an addition polymerization. Examples of saturated acids in such polyesters are phthalic acids in the various isomeric forms.

The polyester resin compositions preferably contain not more than 50, particularly preferably not more than 20% by weight of saturated polyesters, based on the overall weight of the polyester resin compositions without solvent.

The unsaturated polyester have structures of the formula (I)

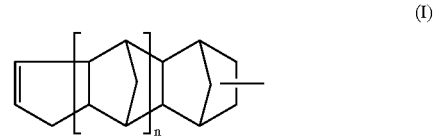

(I)

where n is from 0 to 10. n here can be an integer or else may denote a mean value. Preferably, n is from 0 to 7, particularly preferably from 0 to 5 and, in particular, from 0 to 3. Preferred examples of n are 0, 1, 2. The structures of the formula (I) are based on cyclopentadiene (CPD) or dicyclopentadiene (DCPD). Processes for preparing these structures are known, for example, from M. C. Kloetzel; Org. Reactions 4 (1948) 1 to 59 or W. M. Carmody; Ind. Eng. Chem. 30 (1938) 245 to 251. The structures may have an oxygen atom on the free valence. Structures with n>0 are preferably produced in situ by a graft reaction of CPD or DCPD, respectively, on structures with n=0 at more than 130° C., preferably more than 170° C.

The polyesters may also preferably have structures of the formula (II)

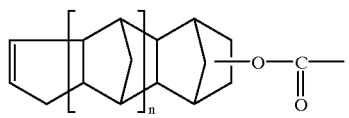

(II)

where n is from 0 to 10. The preferred ranges of n are as indicated above. The structures of the formula (I) can be prepared by reaction with carboxylic acids. These carboxylic acids are preferably present in the polyester or are introduced as polycarboxylic acids into the polyester.

The polyesters preferably have structures of the formula (III)

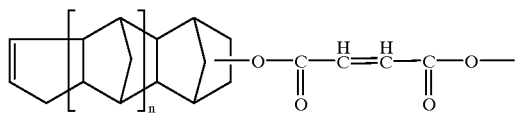

where n is from 0 to 10. In this case, all possible isomeric structures can be present at the ethylenic double bond. The preferred ranges for n are as indicated above. The structures of the formula (II) and (III) can be prepared by reacting maleic anhydride with dicyclopentadiene or similar compounds. This produces monosubstituted maleic acids, which therefore have a free acid function. These compounds are linked with the polyesters. The structures of the formula (II) and (III) are preferably in the form of esterification products.

Structures of the formulae (I) and/or of the formula (II) and/or of the formula (III) can also, in addition, be present in the form of monomeric or oligomeric compounds in the polyester resin solutions. In this case the structures are preferably in the form of esterification products. In this case esterification can take place with monohydric alcohols and/or polyhydric alcohols and/or alkoxylation products thereof and/or polyether polyols and/or polyester polyols. They can be obtained, for example, by reaction with polyether polyols or polyester polyols of polyethylene oxide, polypropylene oxide, polytetrahydrofuran and/or polycaprolactone. Examples of preferred alcohols are neopentylglycol, propylene glycol, dimethylolethane, cyclohexanediol, 1,6-hexanediol, trimethylolpropane, diethylene glycol monoethyl ether, and ethoxylation products or propoxylation products thereof It is possible in particular to use an ethoxylation product of 1 mol of trimethylolpropane and 20 mol of ethylene oxide. Through the nature of the alkylating agents and the degree of alkoxylation it is also possible to control properties of the end products such as hardness, hydrophilicity and elasticity. It is also possible to carry out only partial reaction of such polyols with structures of the formulae (I) to (III), the remaining hydroxyl groups either remaining free or possibly being esterified or etherified with other compounds or reacted with other compounds that are reactive with hydroxyls. Examples of suitable such compounds are isocyanates or epoxides, and also hydroxyl-containing natural oils such as castor oil.

Preferred monomeric and oligomeric products are obtained by reacting equal molar proportions of dicyclopentadiene and maleic anhydride in the presence of water and then reacting the products with polyols, the number of OH groups in the polyols corresponding to the number of free acid functions of the substituted maleic acid. Particularly preferred alcohols in this case are 1,6-hexanediol, trimethylolpropane with 20 EO (ethylene oxide) and diethylene glycol monoethyl ether.

The structures of the formulae (I) to (III) can also be present in the corresponding monomeric and oligomeric compounds in the form of amide or amine bonds. These compounds can be prepared, for example, by reaction with mono- and polyfunctional amines.

The products of these reactions can be salt-like adducts, although amides are preferred. Examples are the reaction products of amino-functional polyethylene oxides, polypropylene oxides or diene oils.

Dihydrodicyclopentadienol, corresponding to the structure of the formula (I) with a hydroxyl on the free valence, is industrially obtainable. Accordingly, ester structures can also be introduced by esterifying mono- or polycarboxylic acids or carboxyl functions of the polyesters with this alcohol.

The structures of the formulae (I) to (III) can be introduced into the polyesters as end group substituents after the polyesters have been prepared or can be employed already as additional monomer components in the reaction mixture used for preparing the polyesters. In this case the structures can be attached at different sites on the polymer backbone. When used as end group substituents, the proportion of structures which can be introduced in this way is limited. Especially in the case of high molecular mass polyesters the additional use of the monomeric or oligomeric compounds is advantageous for increasing the reactivity.

Cyclopentadiene can be grafted onto the double bonds of the unsaturated polyesters employed in accordance with the invention to give endomethylenetetrahydrophthalic acid structures. This is particularly the case when maleic or fumaric acid is employed.

It is preferred to employ polyesters containing from 5 to 40, particularly preferably from 5 to 10% by weight of these structures. The polyester resin compositions preferably contain from 50 to 100, particularly preferably from 70 to 100, and in particular, from 90 to 100% by weight of monomeric or oligomeric or polymeric compounds which have the structures of the formulae (I) and/or (II) and/or (III).

In this way it is possible to achieve good curing even with polyesters which have few unsaturated sites without the need to add monomers containing acrylic, allylic or vinylic unsaturation. Moreover, it is necessary to add only small amounts of solvents in order to obtain an appropriate viscosity.

Following the impregnation, casting or application as a coating of the polyester resin solutions (impregnating varnishes) employed in accordance with the invention, and after removal of the solvent, thermal and/or photochemical curing is carried out. For this purpose the impregnated varnishes preferably include compounds or functional groups which can be thermally and/or photochemically activated in order to initiate crosslinking or free-radical polymerization. These initiators can be attached chemically to the polyesters or can be present as free compounds in the impregnating varnishes. Examples of thermally activatable initiators are compounds which form free radicals when heated. Known free-radical initiators are peroxides, azo compounds, azides and C—C-labile compounds. A considerable acceleration of the curing and/or reduction in the curing temperature is possible when metal coinitiators are used, such as compounds of cobalt, of manganese, of iron, of nickel or of lead. The polyester resin compositions according to the invention are highly UV-sensitive in the presence of UV initiators of the α-cleaving type (Norrish Type I) or of the H-donor/acceptor systems (Norrish Type II). A preferred mode of introducing H-acceptor groups in this case is the concomitant use of phenone compounds which can be incorporated by condensation, for example hydroxy- or bishydroxybenzophenone, in the course of the polycondensation of the polyester resins. In this case the photoinitiators are activated with actinic radiation, preferably TV radiation. Other suitable photoinitiators have xanthone structures, thioxanthone structures and/or the above phenone structures. The photoinitiator is preferably hydroxybenzophenone, which is incorporated by condensation into the polyesters. Furthermore, the introduction of benzophenone structures by way of benzophenone di- and/or -tetracarboxylic acid derivatives, preferably benzophenonetetracarboxylic dianhydride, is possible with preference.

In this context, curing can take place in one or more steps. For example, curing can be carried out first with actinic radiation and subsequently or simultaneously with peroxides or C—C-labile substances. It is also possible to carry out partial curing, with complete curing following at a later point in time. Suitable initiators and curing techniques are set out in the documents described at the outset.

Preferably, after removal of the solvent, the polyester resin solutions (impregnating varnishes) are first of all cured on the surface with UV light and then cured to completion using thermally activatable initiators with heating. Also of importance is a process in which the polyester resin solutions, for example in electrical windings, are first of all cured in the interior of the components by means of heat, which is generated by the flow of an electric current through the component, and then are after-cured, if desired, on the surface with UV light. Any desired combination and sequence of the above-mentioned methods can be used for curing.

The viscosity of the polyester resin solutions employed in accordance with the invention can be adjusted not only by mixing with the solvent but also by mixing together different polyesters. Preferably, monomeric or oligomeric compounds as well as are added which have structures of the formulae (I)/(II)/(III). For instance, it is possible to use polyesters having a relatively high melt viscosity and a high softening point in the present invention, and to establish the desired low viscosity of the solvent and these compounds. These compounds can therefore be termed "reactive diluents", but do not have the disadvantages of the known ethylenically unsaturated compounds such as styrene.

The polyester resin solutions preferably have a viscosity of below 5000 mPas at 25° C., more preferably less than 3000 mPas. They are preferably stable in terms of viscosity for at least 24 hours at a temperature at which they have a viscosity of not more than 2000 mPas, particularly preferably not more than 500 mPas. Owing to the special reactivity of the dicyclopentadienyl structures in the monomeric, oligomeric or polymeric compounds having structures of the formulae (I), (II) or (III), it is possible to provide polyester resin solutions which are catalyzed ready for reaction and which can be processed in liquid form without the use of known unsaturated monomers such as styrene, vinyltoluene, α-methylstyrene, allyl esters and (meth)acrylic esters.

However, it is also possible to make additional use of these known monomers containing acrylic, allylic or vinylic unsaturation, in small amounts, for example in order to formulate low-styrene polyester resin solutions which are of low viscosity. Consequently it is possible, for example, to formulate low-styrene polyester resin solutions which meet statutory limits on styrene concentrations or styrene emissions. Preferably, none of these reactive diluents is present.

Where specific requirements are imposed on the polyester resin coatings, for example on the hardness or elasticity, the composition of the polyesters in the polyester resin compositions can be adapted correspondingly. For example, the chain length of the polyols or polycarboxylic acids can be varied. Polyester resins composed with hexanediol or adipic acid, for example, are more flexible than polyester resins based on phthalic acid and ethylene glycol. In addition, it is known to control the properties by the concomitant use of polyfunctional compounds, which produce branches in the polyester molecules. Known compounds are trimellitic acid and trimethylolpropane.

The polyester resin compositions or solutions can be prepared by any desired methods. Preferably, the compounds which regulate the reactivity and viscosity, and have structures of the formulae (I) and (II) or (III), are prepared separately and then mixed with the polyesters, the solvent and any other compounds used. In many cases it is also possible by appropriate adjustment of the stoichiometric proportions to prepare in situ nonpolyester compounds which regulate the reactivity and viscosity in the course of the polyester preparation.

The polyester resin solutions used in accordance with the invention may, moreover, include further ingredients customary for polyester resins, such as catalysts, color-imparting compounds, pigments, fillers and other auxiliaries.

The polyester resin solutions used in accordance with the invention can be employed as impregnating, casting or coating solutions for the coating of shaped articles or films. Corresponding impregnating, casting or coating techniques are known to the skilled worker. Examples of shaped articles and components are wires and wound articles, such as coils, motor windings, transformer windings or corresponding film-based components.

The invention is illustrated in more detail below by way of examples.

EXAMPLES

Example 1

A stirred flask fitted with heater and distillation device is charged with 317.1 g (2.1 mol) of dihydrodicyclopentadienol, 292.3 g (2.0 mol) of adipic acid, 101.3 g (1.0 mol) of 1,6-hexanediol and 0.7 g of dibutyltin dilaurate (DBTL). The mixture is heated rapidly to 120° C. under a gentle stream of nitrogen. The temperature is gradually raised to 190° C. over 4 hours, during which the water of condensation which forms is distilled off A resin having an acid number of 11 and viscosities of 1540 mPas at 25° C. and 260 mPas at 50° C. is obtained.

Example 2

A stirred flask fitted with a heater and reflux condenser is charged with 661.1 g (5.0 mol) of dicyclopentadiene and 490.3 g (5.0 mol) of maleic anhydride. The mixture is heated to 125° C. under a gentle stream of nitrogen, and then 95.0 g (5.0 mol+5 g) of water are added through a dropping funnel over the course of one hour. The mixture is left to react at 125° C. for one hour. A monocarboxylic acid as represented in the formula (III) is formed, where the free valence carries a hydroxyl group and n is zero. The contents of the flask are cooled to 70° C., and 245.15 g (2.5 mol) of maleic anhydride, 557.15 g (5.5 mol) of 1,6-hexanediol, 4.0 g of dibutyltin dilaurate (DBTL) and 0.5 g of hydroquinone are added. The mixture is heated rapidly to 120° C. under a gentle stream of nitrogen. Then the temperature is gradually raised to 190° C. over the course of 6 hours, during which the water of condensation which forms is distilled off A highly viscous resin having an acid number of 18 and viscosities of 7840 mPas at 50° C. and 2016 mPas at 75° C. is obtained.

Example 3

A stirred flask fitted with a heater and a reflux condenser is charged with 1586.52 g (12.0 mol) of dicyclopentadiene and 1176.7 g (12.0 mol) of maleic anhydride. The mixture is heated to 125° C. under a gentle stream of nitrogen, and then 226.00 g (12.0 mol+10 g) of water are added through a dropping funnel over one hour. Reaction is allowed to continue at 125° C. for one hour. This gave the monocarboxylic acid of the formula (III) as obtained in Example 2. Then the contents of the flask were cooled to 70° C., and 715.0 g (6.0 mol) of 1,6-hexanediol, 4.0 g of dibutyltin dilaurate DBTL) and 0.5 g of hydroquinone were introduced. The mixture is heated to 120° C. under a gentle stream of nitrogen and the temperature is then gradually raised to 190° C. over 6 hours, with the water of condensation formed being removed by distillation. A soft resin having an acid number of 24 and viscosities of 3650 mPas at 50° C. and 944 mPas at 75° C. is obtained.

Example 4

A stirred flask fitted with a heater and a reflux condenser is charged with 661.1 g (5.0 mol) of dicyclopentadiene and 490.3 g (5.0 mol) of maleic anhydride. The mixture is heated to 125° C. under a gentle stream of nitrogen, and then 95.0 g (5.0 mol+5 g) of water are added through a dropping funnel over one hour. Reaction is allowed to continue at 125° C. for one hour. This gives the monocarboxylic acid of the formula (III) described in Example 2. Then the contents of the flask are cooled to 70° C., and 1859.0 g of TP 200 (TP 200 is an ethoxylation product of one mole of trimethylolpropane and 20 mol of ethylene oxide) (corresponding to 5.5 mol equivalent of OH), 3.00 g of dibutyltin dilaurate (DBTL) and 0.3 g of hydroquinone are introduced. The mixture is then heated rapidly to 120° C. under a gentle stream of nitrogen and the temperature is then gradually raised to 190° C. over 6 hours, with the water of condensation formed being removed by distillation. A highly viscous, fluid resin having an acid number of 21 and viscosities of 9340 mPas at 25° C. and 1560 mPas at 75° C. is obtained.

Impregnating varnishes

The compounds of Examples 1 to 4 can be diluted to give clear formulations—to an unlimited extent with lower ketones such as acetone, methyl ethyl ketone (MEK) and methyl isobutyl ketone (MIBK) and at least to a concentration of 70% by weight with $C_{2-6}$ alcohols. Using mixtures of ketones and alcohols it is possible to obtain even greater dilutions, although this is generally not necessary since the solutions reach the desired viscosities from a concentration of about 80% by weight. It is consequently possible to obtain highly concentrated impregnating varnishes and coating materials.

3 impregnating varnishes were prepared having the compositions indicated below. The parts are by weight.

Impregnating varnish 1

10 parts of resin from Example 1, 80 parts of resin from Example 2, 10 parts of resin from Example 3, 25 parts of isopropanol and 4 parts of tert-butyl perbenzoate are mixed to give a clear solution of low viscosity (86 s/DIN 4).

Impregnating varnish 2

10 parts of resin from Example 1, 80 parts of resin from Example 2, 10 parts of resin from Example 4, 25 parts of isopropanol and 4 parts of tert-butyl perbenzoate are mixed to give a clear solution of low viscosity (93 s/DIN 4).

Impregnating varnish 3

10 parts of resin from Example 1, 80 parts of resin from Example 2, 10 parts of resin from Example 4, 25 parts of isopropanol, 4 parts of tert-butyl perbenzoate and 3 parts of Lucirin® BDK (BASF) are mixed to give a clear solution of low viscosity (91 s/DIN 4).

The impregnating varnishes are applied to degreased metal panels using a doctor blade with a gap height of 100 μm. This corresponds to a dry film thickness of 55 μm. The panels are then conditioned at 130° C. for 2 hours in a convection oven. Brownish, clearly transparent, hard coatings are obtained which are resistant to methyl ethyl ketone.

The panels coated as above are also conditioned at 80° C. for 3 hours in a convection oven. The coatings obtained are tacky. The panels are subsequently irradiated for 2 minutes using a medium-pressure mercury lamp having an energy of 80 mW/cm². In this case the surface tack is slightly reduced in the case of impregnating varnishes 1 and 2, where in the case of impregnating varnish 3 a brownish, clearly transparent, hard coating is obtained which is resistant to methyl ethyl ketone.

Samples of the ready-to-use impregnating varnishes prepared as indicated above are stored in sealed glass bottles at room temperature for one year, at 40° C. for one month and at 60° C. for one week. In all cases neither the viscosity nor the curing properties are changed after this storage.

We claim:

1. A polyester resin impregnating or coating solution comprising polyesters having the structures of the formula (I)

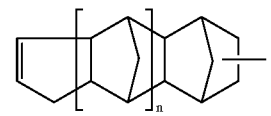

(I)

where n is from 0 to 10, and a solvent, and where the solution contains not more than 5% by weight of monomers containing acrylic, vinylic or allylic unsaturation, based on the total weight of the solution.

2. A solution as claimed in claim 1, wherein the solvent employed comprises aliphatic sated $C_{2-6}$ alcohols, $C_{3-6}$ ketones or $C_{3-6}$ carboxylic esters or mixtures thereof.

3. A solution as claimed in claim 1, wherein the proportion of the solvent is from 5 to 60% by weight of the overall solution.

4. A solution as claimed in claim 1, wherein the polyesters have structures of the formula (II)

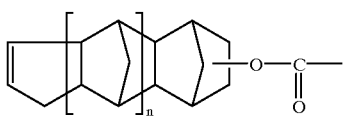

(II)

where n is from 0 to 10.

5. A solution as claimed in claim 4, wherein the polyesters have structures of the formula (III)

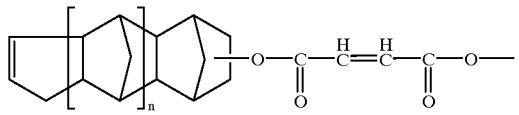

(III)

where n is from 0 to 10.

6. A solution as claimed in claim 5, which comprises monomeric or oligomeric compounds containing structures of formula (I).

7. A solution as claimed in claim 6, wherein the monomeric or oligomeric compounds are based on mono- or polyhydric alcohols which are esterifed with the structures of the formula (III).

8. A solution as claimed in claim 1, which comprises photoinitiators and/or thermally activatable initiators for curing the polyester resins.

9. A process for coating shaped articles or films by
impregnation in, casting with the polyester resin solution as defined in claim 1,
removing the solvent and
thermally and/or photochemically curing the polyester resin coating.

10. A solution as claimed in claim 1, wherein the solution is free of monomers containing acrylic, vinylic or allylic unsaturation.

11. A solution as claimed in claim 1, wherein the solvent comprises an aliphatic saturated $C_{2-4}$ alcohol.

12. A solution as claimed in claim 1, wherein the solvent is free from aromatics.

13. A solution as claimed in claim 1, wherein the proportion of the solvent is from 8 to 20% by weight of the overall solution.

14. A solution as claimed in claim 1, wherein the solvent consists of aliphatic saturated $C_{2-6}$ alcohols, $C_{3-6}$ ketones or $C_{3-6}$ carboxylic esters or mixtures thereof, and wherein the proportion of the solvent is from 5 to 60% by weight of the overall solution.

* * * * *

UNITED STATES PATENT AND TRADEMARK OFFICE
CERTIFICATE OF CORRECTION

PATENT NO. : 6,200,645 B1
DATED : March 13, 2001
INVENTOR(S) : Blum et al.

Page 1 of 1

It is certified that error appears in the above-identified patent and that said Letters Patent is hereby corrected as shown below:

Column 10, claim 2,
Line 61, "sated" should be -- saturated --.

Column 12, claim 9,
Line 5, after "casting with" insert -- or coating with --.

Signed and Sealed this

Twenty-eighth Day of August, 2001

Attest:

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,200,645 B1  
DATED : March 13, 2001  
INVENTOR(S) : Blum et al.

Page 1 of 1

It is certified that error appears in the above-identified patent and that said Letters Patent is hereby corrected as shown below:

<u>Title page,</u>
Item [73], the assignee information should read: -- Schenectady International, Inc. Schenectady, NY (US) --.

Signed and Sealed this

First Day of January, 2002

Attest:

*Attesting Officer*

JAMES E. ROGAN  
*Director of the United States Patent and Trademark Office*